United States Patent
Peters et al.

(10) Patent No.: US 8,161,732 B2
(45) Date of Patent: Apr. 24, 2012

(54) SYSTEM AND METHOD TO IMPROVE ENGINE EMISSIONS FOR A DUAL FUEL ENGINE

(75) Inventors: Mark William Peters, Wolverine Lake, MI (US); John M. Roth, Grosse Ile, MI (US); Ken O. Jahr, West Bloomfield, MI (US); Jason Eugene Devries, Belleville, MI (US); John Hedges, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1085 days.

(21) Appl. No.: 12/042,747

(22) Filed: Mar. 5, 2008

(65) Prior Publication Data

US 2009/0223206 A1    Sep. 10, 2009

(51) Int. Cl.
*F01N 3/00* (2006.01)
*F02B 13/00* (2006.01)

(52) U.S. Cl. .......... 60/287; 60/274; 60/276; 60/288; 123/575

(58) Field of Classification Search .......... 60/274, 60/276, 284, 287, 288, 299, 301, 324; 123/515, 123/575, 576, 578
See application file for complete search history.

(56) References Cited

U.S. PATENT DOCUMENTS

| | | | |
|---|---|---|---|
| 4,319,453 A | | 3/1982 | Mann |
| 4,656,831 A * | | 4/1987 | Budininkas et al. ............ 60/297 |
| 4,913,099 A * | | 4/1990 | Ota ............................. 123/478 |
| 5,051,244 A * | | 9/1991 | Dunne et al. ................... 423/212 |
| 5,082,174 A * | | 1/1992 | Joji ............................... 237/2 A |
| 5,085,050 A * | | 2/1992 | Katoh ............................ 60/288 |
| 5,189,878 A | | 3/1993 | Robinson et al. |
| 5,269,140 A * | | 12/1993 | Take et al. ....................... 60/274 |
| 5,519,993 A * | | 5/1996 | Rao et al. ....................... 60/288 |
| 6,581,370 B2 | | 6/2003 | Sato et al. |
| 6,817,172 B2 | | 11/2004 | Tamura |
| 6,820,419 B2 | | 11/2004 | Ford et al. |
| 6,823,660 B2 | | 11/2004 | Minami |
| 7,121,087 B2 | | 10/2006 | Hotta et al. |
| 2001/0032458 A1* | | 10/2001 | Suzuki et al. ................... 60/288 |
| 2009/0114196 A1* | | 5/2009 | Haugen ........................ 123/575 |

FOREIGN PATENT DOCUMENTS

| | | | |
|---|---|---|---|
| JP | 63235617 A | * | 9/1988 |
| JP | 08035419 A | * | 2/1996 |

OTHER PUBLICATIONS

Hosoya, English Abstract of JP 08-035419 A, Feb. 6, 1996.*
Fujimoto, English Abstract of JP 63-235617 A; Sep. 30, 1988.*

* cited by examiner

*Primary Examiner* — Thomas Denion
*Assistant Examiner* — Audrey K Bradley
(74) *Attorney, Agent, or Firm* — Allan J. Lippa; Alleman Hall McCoy Russell & Tuttle LLP

(57) ABSTRACT

A system and method for improving emissions of an engine capable of combusting a multi-component fuel comprised of two or more fuels is presented. According to the method, the passage exhaust gases are processed in said exhaust system is determined in part from the concentration of one component fuel.

19 Claims, 3 Drawing Sheets

SYSTEM AND METHOD TO IMPROVE ENGINE EMISSIONS FOR A DUAL FUEL ENGINE

FIELD

The present description relates to a method for reducing emissions of an internal combustion engine that combusts fuel that may vary in composition.

BACKGROUND

One system and method for processing engine exhaust gas emissions is described in U.S. Pat. No. 6,581,370. The patent describes a single exhaust system having two different passages that are capable of treating engine emissions in different ways. This arrangement provides different ways to treat engine exhaust emissions for different engine operating conditions. In particular, the patent describes a system wherein exhaust gases are directed through a passage that contains a hydrocarbon trap when the exhaust system temperature is low. Then, when the humidity of exhaust gas downstream of a hydrocarbon trap exceeds a predetermined amount, engine exhaust gases are redirected through a passage that has no emissions control device. In this way, the system purportedly reduces engine hydrocarbon emissions.

The above-mentioned system can also have several disadvantages. Specifically, the system simply decides when to switch between exhaust passages in response to humidity sensed downstream of the hydrocarbon trap. While this may be adequate for a single type of fuel, it may be less effective for different types of fuels that produce different concentrations of water vapor after being combusted. Specifically, when alcohol based fuels such as ethanol are combusted they produce higher water concentrations in the exhaust gases. Since traps tend to be less than 100% efficient, combusting ethanol can increase the humidity level observed in the exhaust gases after the hydrocarbon trap as compared to the humidity produced when gasoline is combusted. This condition may cause the system to switch between exhaust paths before the trapping cycle is complete, thereby reducing hydrocarbon conversion efficiency. Further, the increased sensed humidity may cause the system to believe that the hydrocarbon trap has degraded since trapping time may be reduced.

The inventors herein have recognized the above-mentioned disadvantages and have developed a system and method that offers substantial improvements.

SUMMARY

One embodiment of the present description includes a method to improve exhaust emissions of an internal combustion engine capable of combusting a fuel comprised of two or more component fuels, the method comprising: combusting a fuel comprised of two or more component fuels in a group of cylinders during an engine start; and routing the exhaust products of said combusted fuel through an exhaust gas after treatment system through a first passage or a second passage in response to the concentration of one of said two component fuels. This system overcomes at least some disadvantages of the above-mentioned method.

Performance of an exhaust system having selectable exhaust passages can be improved when the exhaust passage is selected, at least in part, in response to the fuel being combusted. As mentioned above, when a particular fuel is combusted, it produces byproducts, such as water, that can affect the efficiency of emissions control devices located in the exhaust system. By considering the type of fuel combusted, a controller can compensate for the combustion byproducts by adjusting how exhaust gases are processed in an exhaust system. For example, if an alcohol fuel is combusted, it may be desirable to process the exhaust gases through a condenser or through a hydrocarbon trap. In this way, water may be extracted from the exhaust gases before the exhaust gases reach a catalytic converter. Also, exhaust emissions may be reduced when switching between exhaust processing passages is linked to fuel type because trap/condenser utilization can be improved by providing a better estimate of water vapor entering the trap/condenser. As a result, the possibility of switching between exhaust passages prematurely or late can be reduced.

On the other hand, if gasoline is combusted and less water vapor is entrained within the exhaust gases, it may be desirable to process the exhaust gases through the catalyst and bypass the condenser or hydrocarbon trap. This mode of operation may expedite catalyst light-off since exhaust gases will reach the catalyst at a higher temperature. Consequently, it may be desirable to select the position of a bypass valve simply based on the fuel type combusted.

The present description can provide several advantages. Namely, the approach can improve trap/condenser utilization by providing an improved exhaust water vapor estimate. Further, the approach can reduce the amount of time it takes an exhaust system to reach a desired conversion efficiency when a particular type of fuel is combusted. The system also provides a low cost solution for improving catalyst efficiency for engines that combust different fuel types. Further, the system may provide improved reliability over other systems because there may be fewer indications of a degraded trap/condenser when the fuel type is used to control the water trapping sequence.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
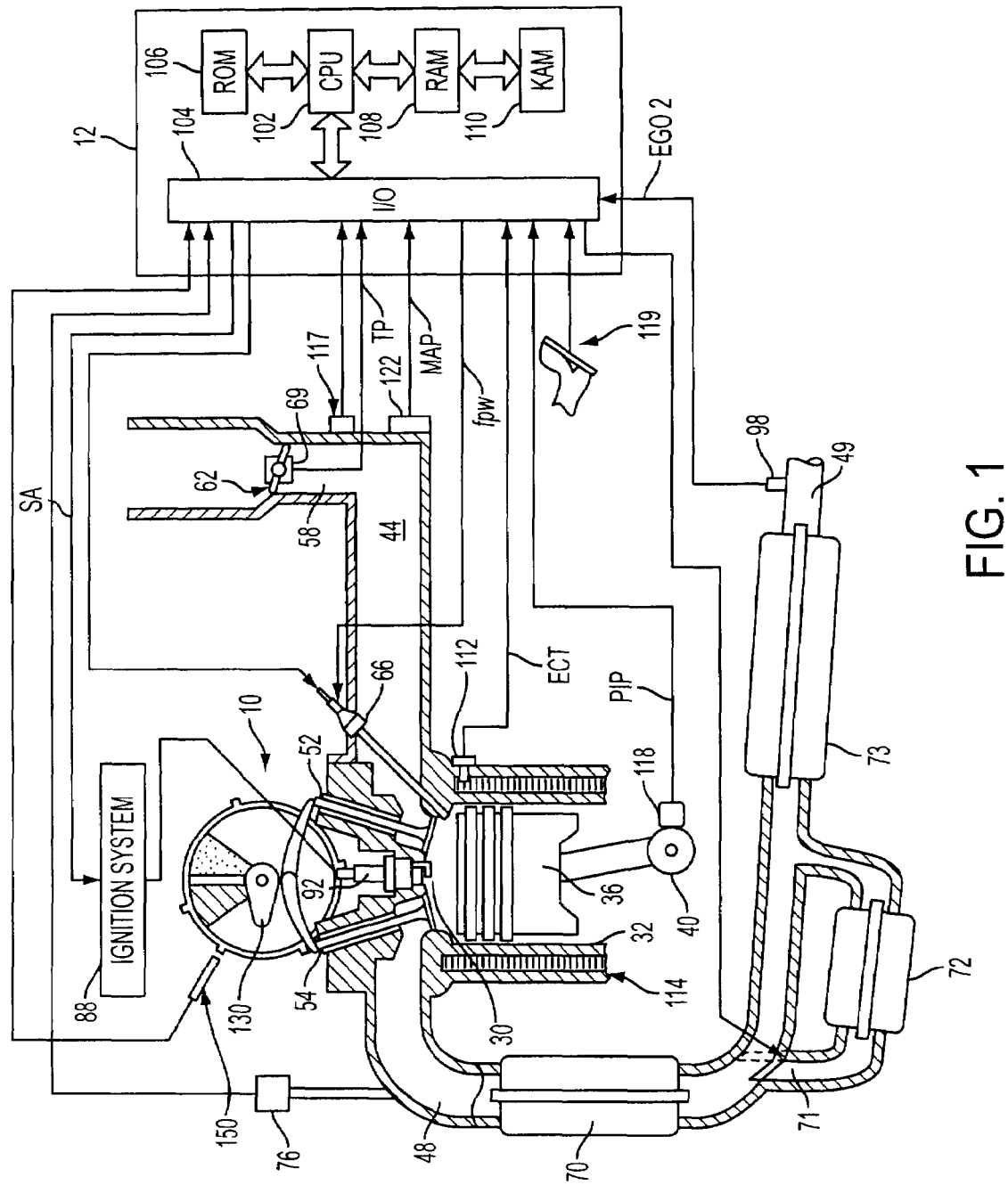
FIG. 1 is a schematic diagram of an engine, its fuel system, and its control system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with cam shaft 130 and piston 36 positioned therein and connected to crankshaft 40. Combustion chamber 30 is known communicating with intake manifold 44 and exhaust manifold 48 via respective intake valve 52 an exhaust valve 54. Fuel injector 66 is shown having a nozzle capable if injecting fuel directly into combustion chamber 30 in an amount in proportion to the pulse width of a signal from controller 12. Fuel is delivered to fuel injector 66 by fuel system (not shown) including a fuel tank, fuel pump, and fuel rail (not shown). Intake manifold 44 is also shown communicating with throttle body 58 via throttle plate 62.

Conventional distributorless ignition system 88 provides ignition spark to combustion chamber 30 via spark plug 92 in response to controller 12. Alternatively, the spark plug and ignition system may be removed for compression ignition engines. Universal oxygen sensor (UEGO) 76 is shown coupled to exhaust manifold 48 upstream of close-coupled catalytic converter 70. Alternatively, a two state oxygen sensor may be substituted for the linear sensor 76. Exhaust gases are directed to hydrocarbon trap 72 when diverter valve 71 is positioned to block direct flow from catalytic converter 70 to catalytic converter 73. Exhaust gases exiting hydrocarbon trap 72 are directed to catalytic converter 73. If diverter valve 71 is positioned to allow flow from close-coupled catalytic converter 70 to downstream catalytic converter 73, then hydrocarbon trap 72 is bypassed. Alternatively, hydrocarbon trap 72 may be replaced by a condenser that converts water vapor to liquid water. A humidity sensor can be placed in the exhaust gas stream behind trap 72 if desired. Diverter valve 71 is shown in a position (solid lines) to bypass hydrocarbon trap 72, but may also be in a position (dashed lines) to direct exhaust gases to hydrocarbon trap 73. Two-state exhaust gas oxygen sensor 98 is shown coupled to exhaust pipe 49 downstream of catalytic converter 73.

In an alternate configuration, trap 72 may be positioned such that engine exhaust gases may pass through the trap/condenser before being processed by emissions control device 70. That is, when the engine is started, diverter valve 71 can direct exhaust gases to trap/condenser 72 before the exhaust is processed by emissions device 70. The output of trap 72 in this configuration is directed to the input of emissions device 70. And, the output of emissions device 70 is directed to the inlet of emissions device 73.

Controller 12 is shown in FIG. 1 as a conventional microcomputer including: microprocessor unit 102, input/output ports 104, and read-only memory 106, random-access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; throttle position from throttle position sensor 69; a measurement of manifold absolute pressure (MAP) form pressure sensor 122 coupled to intake manifold 44; a measurement (ACT) of engine air amount temperature or manifold temperature from temperature sensor 117; a cam position signal (CAM) from a variable reluctance cam sensor 150; and a crankshaft position signal (CPS) from a variable reluctance sensor 118 coupled to a crankshaft 40, and an engine torque demand sensor 119. Alternatively, other types of sensors may be substituted for the above-mentioned sensor type (e.g., Hall sensors or optical sensors may be used in place of variable reluctance sensors).

Storage medium read-only memory 106 can be programmed with computer readable data representing instructions executable by processor 102 for performing the methods described below as well as other variants that are anticipated but not specifically listed.

Figure 2:
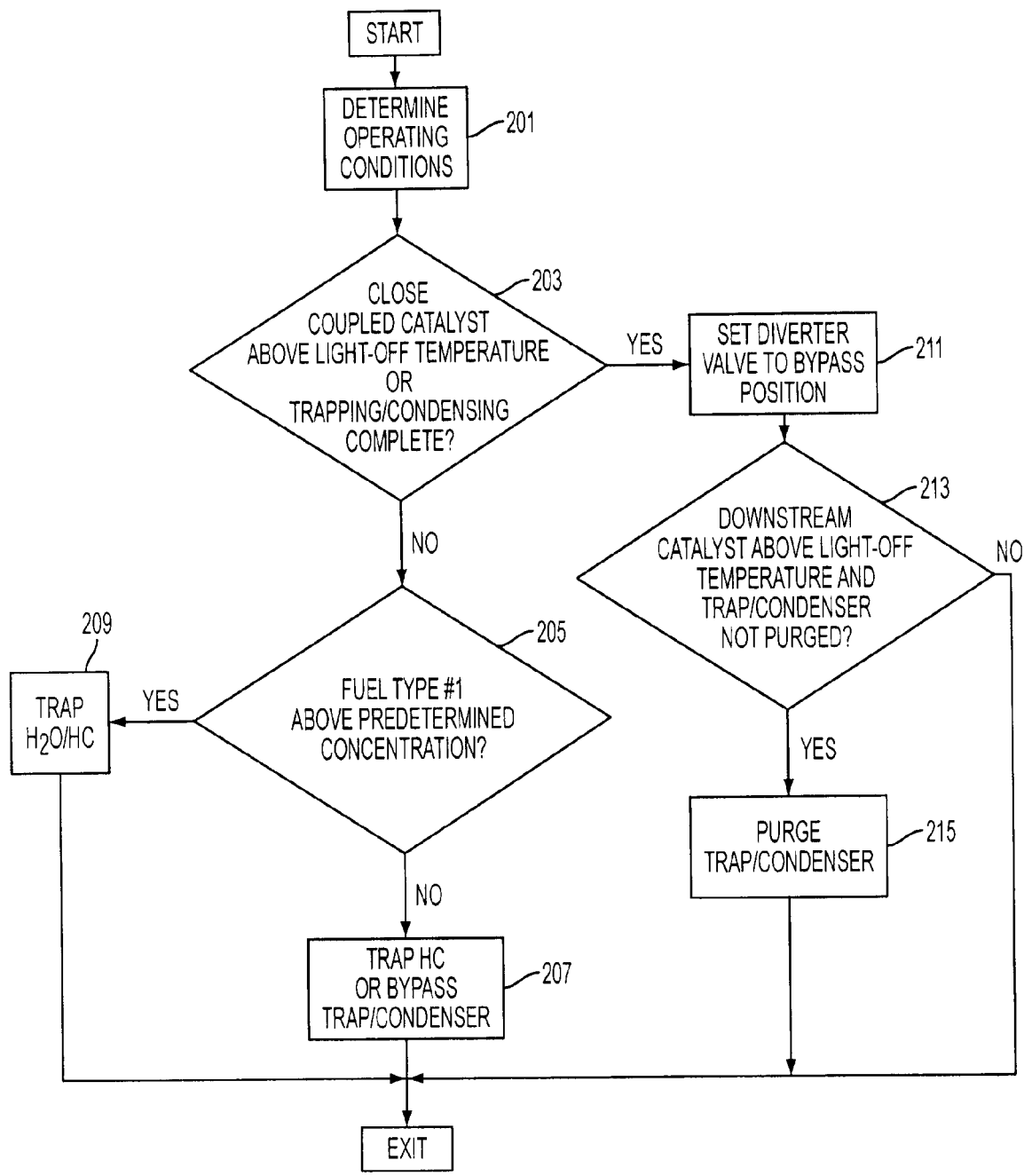
FIG. 2 is a flowchart of an example exhaust processing control strategy.

Referring now to FIG. 2, a flow chart of an example exhaust processing control method is shown. The method of FIG. 2 operates diverter valve 71 to direct exhaust gases in one of two passages for processing. In one embodiment, a hydrocarbon trap is used to trap hydrocarbons and water. In another embodiment, a condenser is used to convert water vapor to liquid water so that the downstream emissions control device (e.g., catalyst) is exposed to less water vapor.

At step 201, operating conditions are determined. In one embodiment, controller 12 determines engine fuel type (e.g., the concentration of alcohol in a gasoline/alcohol mixed fuel), ambient air temperature, temperatures of close coupled and secondary emissions control devices, time since the last engine start, barometric pressure, humidity, engine temperature, and other related conditions.

Characteristics of component fuels that contain mixtures of fuel types, such as gasoline and alcohol, may be determined by known methods (e.g., sensors that determine permissibility or capacitance, or from observing exhaust gas oxygen concentration and amount of fuel combusted). The routine proceeds to step 203 after operating conditions are determined.

In step 203, the routine determines if the close coupled catalyst has reached light-off temperature (i.e., the temperature at which the catalyst converts a predetermined percent of a certain exhaust gas constituent) or if the trapping or condensing operation is complete. In one example, the trapping process can be determined to be complete by comparing the total mass of water vapor delivered to the trap/condenser versus the trap/condenser capacity. When the mass of water vapor entering the trap/condenser reaches a predetermined percentage of the total trap/condenser capacity, the trapping/condensing operation is determined to be complete. The mass of water exiting the engine can be determined by the fuel type and amount of fuel combusted. The close coupled catalyst temperature can be directly determined by a sensor or it may be inferred from engine parameters (e.g., engine speed/load) if desired.

Hydrocarbon and water trapping can be determined as being complete in several ways. In one embodiment, trapping can be determined complete a predetermined time after an engine start, and the amount of trapping time can be varied based on fuel type. In another embodiment, trapping can be determined to be complete after a predetermined level of humidity that varies with the type of fuel combusted is reached. In yet another embodiment, because elevated trap/condenser temperature can reduce efficiency, trapping can be determined as complete when the trap/condenser temperature exceeds a predetermined level.

If it is determined that the close coupled catalyst has reached light-off temperature, or in the alternative, if trapping is complete, the routing proceeds to step 211. Otherwise, the routine proceeds to step 205.

At step 205, the routine determines if the concentration of a particular fuel type in the fuel mixture supplied to the engine is above a predetermined level. In one embodiment, the routine determines if the concentration of ethanol exceeds a predetermined fraction of the total fuel concentration combusted by the engine. In another embodiment, the routine determines if the concentration of methanol or other alcohol exceeds a predetermined concentration. If the fuel fraction of one fuel type exceeds a predetermined fraction of the total fuel delivered to the engine, the routine proceeds to step 209. Otherwise, the routine proceeds to step 207.

Fuel type may be determined by sensing properties of the fuel being delivered to the engine (e.g., permissibility to selected light wavelengths or capacitance) or from combustion products. In one example, the amount of air and fuel combusted during a particular cylinder cycle can be determined and compared to the oxygen level in the exhaust. Particular exhaust gas oxygen concentration levels can then be related to a particular type or mixture of fuel; thereby, determining the fuel type.

In step 205, the routine can also determine an amount of time, or an exhaust gas temperature, at which it is desirable to stop trapping exhaust gas constituents in response to the determined fuel type supplied to the engine.

It should be noted that some hydrocarbon traps begin to release hydrocarbons and water as the hydrocarbon trap temperature increases. Further, hydrocarbon traps can also begin to release hydrocarbons and water as the velocity of gas traveling through the trap increases. Therefore, it is desirable to redirect exhaust gases through the downstream catalyst 73 before the traps begin to release (Note that water formed in a condenser can also be released from the condenser as condenser temperature increases).

The temperature of exhaust system components and exhaust gas temperature may be inferred from engine parameters (e.g., air mass flow, engine speed, and spark advance) or it may be determined from a sensor. A desired trapping time can be determined from empirical testing of particular fuel types and then stored in memory for retrieval at a later time. Consequently, the method or system may be constructed using tables and functions to hold empirically or experimentally determined parameters for various fuel concentrations that can be used by step 203 to determine if trapping or condensing is complete. In this example, if the routine determines that a fuel having a particular concentration of one fuel type has exceeded a predetermined trapping time the routine stops trapping and exhaust gases bypass the trap.

In still another embodiment, the routine can also determine a humidity level, that when observed behind trap 72, indicates that trapping is complete. As mentioned above, certain types of fuel produce different concentrations of water after being combusted. Therefore, the amount of humidity at which it is desirable to change the position of the diverter valve can be varied in response to the type or concentration of a particular fuel being combusted. In one embodiment, the routine can select a humidity level that indicates when trapping is complete based on a concentration of alcohol present in the fuel and the concentration of water in the exhaust gases after the exhaust gases pass through the trapping device (e.g., hydrocarbon trap or condenser). Likewise, this information can be used in step 203 to determine the diverter valve position.

At step 207, the routine determines whether or not water/hydrocarbons should be trapped during an engine cold start or if the trapping device should be bypassed. In one embodiment, when engine temperature or exhaust emissions device temperature is below a predetermined level, exhaust gases are directed to the hydrocarbon trap, or alternatively, to a condenser that is positioned similarly for a predetermined period of time. This embodiment extracts hydrocarbons and/or water vapor from exhaust gases when an engine is started at a temperature that is below a predetermine level, 10° C. for example. This action may reduce the amount of hydrocarbons released to the atmosphere during cold starting conditions.

When engine temperature or emissions control device temperature is above the predetermined level, exhaust gases are directed from the close coupled catalyst to the downstream catalyst bypassing the hydrocarbon trap or condenser. This allows exhaust gases to raise the temperature of downstream catalyst bricks at a rate that exceeds the level possible when exhaust gasses are passed through a trapping device or condenser. Thus, this method may be used to reduce light-off time of downstream catalysts for fuels that produce lower concentrations of water vapor in engine exhaust gases. As a result, engine emissions may be reduced during some conditions.

Referring now to step 209, the diverter valve is positioned to direct exhaust gases into the hydrocarbon trap or condenser. The diverter valve's base position is in the bypass position. The bypass position provides a gas passage around the hydrocarbon trap or condenser. Upon entering step 209, the diverter valve is moved from the base position to the trap/condense position where hydrocarbons/water is trapped and/or condensed to liquid water. After repositioning the diverter valve the routine proceeds to exit.

At step 211, the routine sets the diverter valve to the bypass position as described above. If the diverter valve has been moved to the trap/condenser position in step 209 or 207, it is returned to the bypass position so that exhaust gases exiting the close-coupled catalyst are directed to the downstream catalyst and thereby avoid the hydrocarbon trap/condenser. If the diverter valve is already in the bypass state, the valve remains in that position. The routine then proceeds from step 211 to step 213.

At step 213, the routine determines if the downstream catalyst has reached a predetermined temperature and if the trap/condenser has not been purged. If the trap/condenser has not been purged it is holding hydrocarbons and/or water; therefore, it is desirable for the downstream catalyst to reach operating temperature so that the hydrocarbons can be oxidized or so that release of water vapor to the catalyst has less effect on processing of exhaust gases. In one embodiment, the routine determines if the downstream catalyst has reached a light-off temperature. In this example, the catalyst light-off temperature is based on a catalyst temperature at which the conversion efficiency of a particular gas (e.g., hydrocarbons or NOx) reaches a predetermined level (e.g., 75% efficiency). If the catalyst temperature meets or exceeds the light-off temperature, and the trap/condenser has not been purged, the routine proceeds to step 215. Otherwise, the routine proceeds to exit.

Step 213, can also require other additional engine operating conditions be met before the trap/condenser is purged. For example, if a period of time since trapping/condensing has been exceeded or if engine temperature or exhaust gas temperature is above a predetermined level has been met purging is permitted. If conditions are met, the routine proceeds to step 215. If not, the routine proceeds to step 213.

In another example, the trap/condenser can be purged after the close coupled catalyst reaches a predetermined condition and after the engine has operated at or above a predetermined load for a predetermined amount of time.

In step 215, the trap/condenser is purged of hydrocarbons and/or water vapor. In one embodiment, the diverter valve is opened and the exhaust gases are allowed to pass through the trap/condenser to the downstream catalyst where the once trapped hydrocarbons/water can be oxidized or passed through. Since the amount of trapped hydrocarbons and/or water can vary, the diverter valve can be opened and closed a plurality of times during the purge cycle, if desired. In this way, a purge cycle can be comprised of several purge events (i.e., releasing hydrocarbons/water to downstream emissions after treatment device). The diverter valve position can be cycled in response to engine air flow, time since the valve last assumed the bypass position, in response to sensor information, or based on combinations of these and other operating conditions. In one embodiment, the diverter valve can be cycled in response to the output of an oxygen sensor or humidity sensor located at the inlet or outlet of the downstream exhaust after treatment device. Also, the purge duration may be based on the sensed hydrocarbon or exhaust gas humidity concentration. Higher concentrations of hydrocarbons or water vapor lower the amount of time the diverter valve assumes the trap position. By lowering the amount of time that the diverter valve stays in the trap position, the less hydrocarbons or water vapor will have to be processed by the downstream emissions after treatment device (e.g., catalyst).

This sequence allows the downstream catalyst to recover from the purge process and stay efficient. When the diverter valve is in the bypass position, exhaust gases from the engine can be used to elevate the downstream catalyst temperature and to adjust the downstream catalyst state. In other words, between purge events, the engine output can be adjusted to create conditions in the downstream catalyst that improve downstream conversion efficiency so that conversion efficiency is improved during purging events. In one embodiment, the engine can be operated lean during or after the trap is purged to improve downstream catalyst efficiency. Operating the engine lean can increase the amount of oxygen available to the downstream catalyst so that oxidization of released hydrocarbons may be improved. After the trap is purged the routine proceeds to exit.

Figure 3:
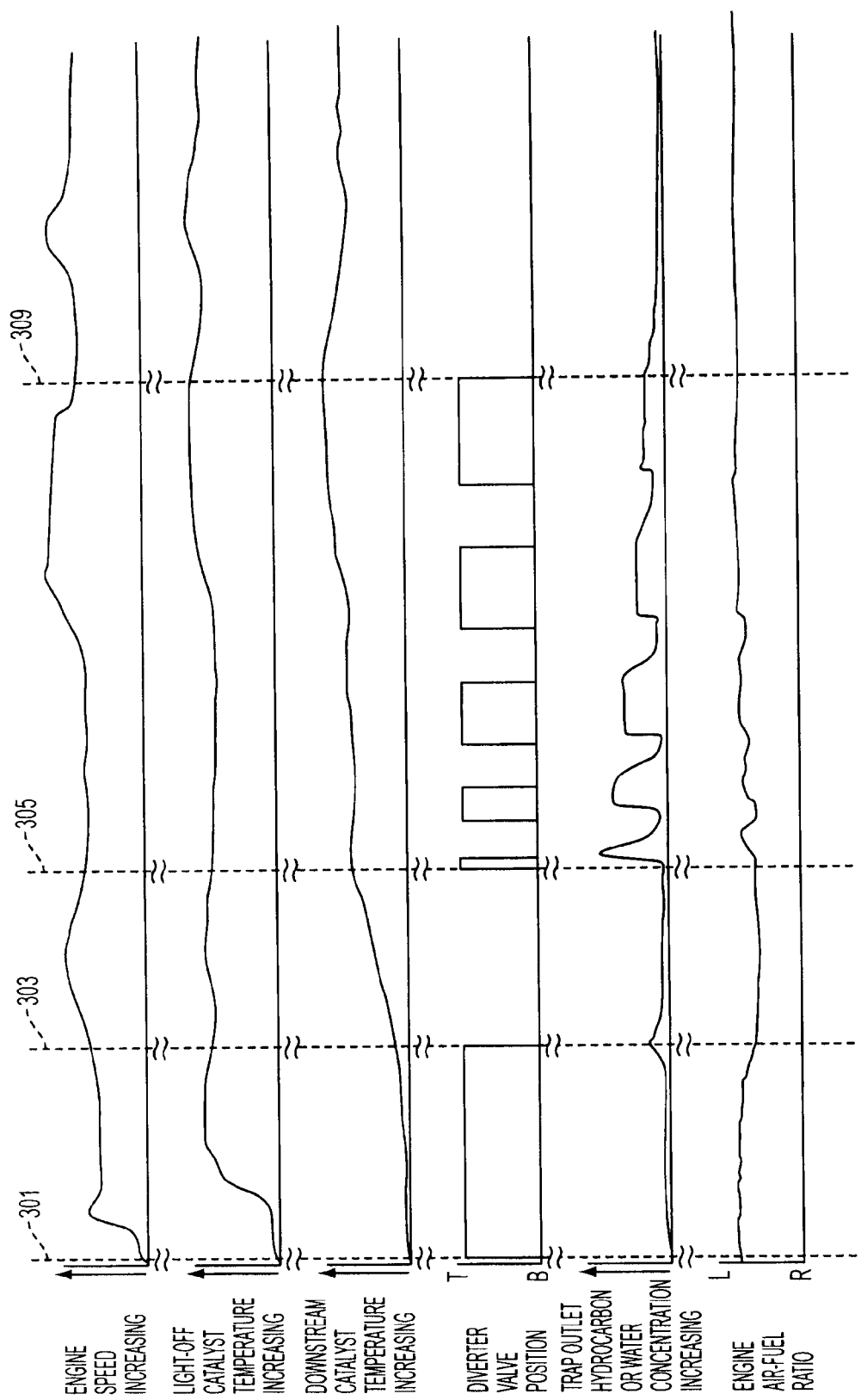
FIG. 3 is an example timing diagram for selected exhaust gases processing signals.

Referring now to FIG. 3, a plot of example signals of interest during a simulated trap and release cycle are shown. The plot represents one example of the control method describe by FIG. 2. The signal trajectories begin at the right side of the figure and move toward the left as time increases.

Beginning with the engine speed trace at the top of the figure, the sequence begins by starting the engine at the vertical marker 301. Engine speed increases from stop and goes to an idle state. The engine speed begins increasing before vertical marker 303, indicating a drive away condition. Between vertical markers 303, 305, and 309 engine speed follows a trajectory similar to one that might occur during a typical vehicle drive sequence.

The next signal, close coupled catalyst temperature, begins to rise immediately after the engine is started. The catalyst temperature increases as exhaust gases exit cylinders and begin to heat the catalyst substrate. The close coupled catalyst temperature levels off between vertical marker 301 and 303. The catalyst temperature in this area is essentially the catalyst operating temperature. The close coupled catalyst temperature is shown varying as engine speed and load vary, but the temperature stays in an efficient operating range even while the engine is at idle conditions.

Downstream catalyst temperature is illustrated below close coupled catalyst temperature and begins to rise after the engine is started. Its temperature rise occurs at a lower rate because the diverter valve is positioned to trap and because it is located further away from the engine. It can be recognized that the downstream catalyst temperature rises at an accelerated rate when the diverter valve changes to the bypass position. Further, the downstream catalyst temperature is also affected by engine speed and load as can be recognized from the temperature trajectory between vertical markers 305 and 309.

The next plot shows diverter valve position which is indicated by letters B (Bypass) and T (Trap). The diverter valve is initially positioned so that the trap/condenser is bypassed which is indicated by the low signal level prior to vertical marker 301. Upon indication of a request to start the engine the diverter valve is shown being repositioned to the trap position.

The diverter valve is repositioned to bypass (B) at vertical marker 303. The valve can be repositioned in response to operating conditions as described in steps 207 and 209 of FIG. 2. In this example, the fuel type and level of humidity or hydrocarbons indicated by a sensor located at the trap outlet, as well as the close coupled catalyst temperature, causes the engine controller to adjust the diverter valve position. Then, when the downstream catalyst reaches a predetermined temperature at 305, the diverter valve is opened and closed a plurality of times in response to the concentration and flow rate of hydrocarbons or water moving from the trap/condenser to the downstream catalyst. In one embodiment, the water and/or hydrocarbon concentration and flow rate can be used to determine an amount of mass that is released from the trap/condenser. When the released mass reaches a predetermined level the diverter valve is switched back to the bypass position. The valve is reopened to the trap position after sufficient time is allowed for the downstream catalyst to process the trap output and for the catalyst to reach a more efficient operating condition.

In another embodiment, the output of a sensor (e.g., an oxygen sensor) placed behind the downstream catalyst may be used to cause the controller to adjust the position of the diverter valve while the trap is being purged. If the concentration of the sensed gas is below a predetermined value the diverter valve is repositioned to the trap position so that the trap contents are purged and processed by the downstream catalyst. Notice that the duration the diverter valve is in trap and bypass position changes as the purge cycle duration increases. This behavior results from the concentration of hydrocarbons/water decreasing as the purge duration increases. Thus, the amount of hydrocarbons/water processed during a particular part of a purge cycle can be controlled such that the processing capacity of the downstream catalyst is not exceeded. As a result, the trapped hydrocarbons can be converted at an efficient rate throughout the purge cycle. Further, the diverter valve can be set to the bypass position if the downstream catalyst efficiency is reduced below a predetermined level while the trap/condenser contents are being processed.

A plot of trap outlet gas concentration follows the diverter valve position plot. A concentration of humidity or water vapor may follow a similar trajectory. System objectives may be considered whether a particular configuration will utilize a hydrocarbon sensor, humidity sensor, or both. The sensor may be placed at the downstream catalyst inlet so that it can sense processed engine exhaust gases when the valve is in the bypass position, or so that it can sense gases exiting the trap/condenser when the diverter valve is in the trap position.

The figure shows hydrocarbon concentration beginning to increase slightly as vertical marker 303 is approached. This condition may be indicative of a trap/condenser meeting its storage capacity. At vertical marker 305, the diverter valve is opened and hydrocarbons are released from the trap. Alternatively, water can be released from a condenser in a similar manner. Initially, a higher concentration of hydrocarbons is released because the trap is at its fullest level and because warm exhaust gases are directed through the trap. The concentration is reduced when the diverter valve is moved to the bypass condition because gases entering the downstream catalyst include gases already processed by the close coupled catalyst.

The trap concentration falls progressively between vertical markers 305 and 309. As hydrocarbons/water are released from the trap/condenser, the release rate decreases which results in a reduction in hydrocarbon/water concentration. At vertical marker 309, substantially all the hydrocarbons/water are released from the trap/condenser.

It should also be noted that the trap purge cycle may be stopped and restarted during a purge cycle to accommodate driver demand or other selected conditions, if desired. This feature may reduce engine emissions during conditions where it may be more difficult to process engine emissions and trap contents simultaneously.

Engine air-fuel ratio is plotted following the trap outlet concentration plot. During a start, the air-fuel is slightly lean to reduce engine hydrocarbon emissions and to promote faster close catalyst light-off. The engine air-fuel ratio is then adjusted to a stoichiometric level to increase conversion efficiency of hydrocarbons, CO, and NOx. Near vertical marker 303, the engine is operated with a slightly lean mixture as the trap is being purged. A lean mixture provides excess oxygen that can be used in the downstream catalyst to process hydrocarbons and CO at a stoichiometric mixture. When the diverter valve is switched to bypass mode, the engine air-fuel ratio is returned to a stoichiometric mixture. Similar air-fuel control continues as the purge cycle continues. When the purge cycle is complete, engine air-fuel ratio is returned to a substantially stoichiometric mixture.

The methods, routines, and configurations disclosed herein are exemplary and should not be considered limiting because numerous variations are possible. For example, the above disclosure may be applied to I3, I4, I5, V6, V8, V10, and V12 engines operating in natural gas, gasoline, diesel, or alternative fuel configurations.

The following claims point out certain combinations regarded as novel and nonobvious. Certain claims may refer to "an" element or "a first" element or equivalent. However, such claims should be understood to include incorporation of one or more elements, neither requiring nor excluding two or more such elements. Other variations or combinations of claims may be claimed through amendment of the present claims or through presentation of new claims in a related application. The subject matter of these claims should be regarded as being included within the subject matter of the present disclosure.

The invention claimed is:

1. A method to improve exhaust emissions of an internal combustion engine capable of combusting a fuel comprised of two or more component fuels, the method comprising:
combusting the fuel comprised of two or more fuel types in a group of cylinders during an engine start; and
routing exhaust products of said combusted fuel through an exhaust gas after treatment system through a first passage or a second passage in response to a concentration of one of said two or more fuel types, including routing said exhaust products through said second passage after a temperature of an exhaust gas emissions device located upstream of the first and second passages reaches a threshold temperature.

2. The method of claim 1 wherein said exhaust products are passaged through said first passage or said second passage by adjusting the position of a valve.

3. The method of claim 1 wherein said first passage or said second passage is further selected in response to a temperature of said engine.

4. The method of claim 1 wherein said first passage is comprised of a condenser.

5. The method of claim 1 wherein one of said two or more fuel types is alcohol.

6. The method of claim 5 wherein said alcohol is ethanol.

7. The method of claim 1 wherein said exhaust products are routed through the first passage after a temperature of an exhaust gas emissions device located downstream of the first and second passages reaches a threshold temperature, and wherein a diverter valve directing the exhaust products to the first and second passages is cycled in response to engine air flow.

8. The method of claim 7 wherein said exhaust products are routed through the first passage in a plurality of purging events.

9. A system for delivering fuel directly to a cylinder of an internal combustion engine, the system comprising:
a fuel injection system that is capable of injecting a fuel that is comprised of at least two fuel types;
a group of cylinders receiving fuel from said fuel injection system;
an exhaust gas after treatment system including a first after treatment device, a second after treatment device positioned in a first passage downstream of the first after treatment device, a second passage bypassing the first passage, and a third after treatment device positioned downstream of the first and second passages; and
a controller to direct exhaust gases through said exhaust gas after treatment system, said controller directing said exhaust gases through said first passage or said second passage in response to a concentration of one of said at least two fuel types and a temperature of the first after treatment device, said controller further directing said exhaust gases through said first passage in response to a temperature of the third after treatment device reaching a threshold.

10. The system of claim 9 wherein said controller operates a bypass valve to direct said exhaust gases through said first passage or through said second passage.

11. The system of claim 9 wherein said controller determines said fuel type from a fuel sensor or from exhaust gases expelled from said cylinder group.

12. The system of claim 9 wherein said controller selects a passage from said first passage and said second passage during an engine start or cold idle period.

13. The system of claim 9 wherein said second after treatment device is a hydrocarbon trap.

14. The system of claim 9 wherein said second after treatment device is a condenser.

15. The system of claim 9 wherein said controller selects said first passage when a concentration of alcohol in said fuel exceeds 20% of the fuel injected to said engine during a cold start.

16. The system of claim 15 wherein said controller further includes a barometric pressure to select said first passage or said second passage.

17. A method to improve exhaust emissions of an internal combustion engine capable of combusting a fuel comprised of two or more component fuels, the method comprising:
a first mode of operation wherein exhaust gases of the engine are directed to a condenser when a temperature of an emissions device positioned upstream of the condenser is less than a threshold;
a second mode of operation wherein exhaust gases of the engine are directed around the condenser when the temperature is greater than the threshold; and
where a controller selects between the first mode and the second mode in response to a concentration of one fuel type of a fuel comprised of two or more fuel types.

18. The method of claim 17 wherein a controller selects between the first and second modes to purge the condenser over a plurality of purging events, and wherein the controller adjusts engine operation between purging events to improve a conversion efficiency during the purging events.

19. The method of claim 17 wherein said exhaust gases are passed through a first passage including the condenser or a second passage bypassing the condenser by adjusting the position of a bypass valve located in an exhaust system of the engine.

* * * * *